United States Patent [19]
Fromm

[11] Patent Number: 5,228,858
[45] Date of Patent: Jul. 20, 1993

[54] CHILDREN'S PAD PRINTING KIT

[76] Inventor: Wayne G. Fromm, 3500 Bathurst Street, Toronto, Ontario, Canada, M6A 2C6

[21] Appl. No.: 872,716

[22] Filed: Apr. 23, 1992

[51] Int. Cl.$^5$ .............................................. G09B 11/06
[52] U.S. Cl. ...................................... 434/84; 434/87; 434/88; 434/85; 101/327; 101/328; 101/368
[58] Field of Search ................ 101/333, 328, 327, 163, 101/368; 434/86, 83, 87, 88, 84

[56]  References Cited
U.S. PATENT DOCUMENTS

| | | |
|---|---|---|
| 1,887,163 | 11/1932 | Lorber . |
| 2,427,612 | 9/1947 | Lobb . |
| 2,918,732 | 12/1959 | Ortega . |
| 2,970,539 | 2/1961 | Griffin .................................. 101/368 |
| 3,408,932 | 11/1968 | Mucci .................................. 434/84 X |
| 3,492,743 | 2/1970 | Schmidt .................................. 434/88 |
| 3,701,317 | 10/1972 | Miyamoto et al. .............. 101/163 X |
| 3,831,518 | 8/1974 | Pittman .................................. 101/368 |
| 4,604,062 | 8/1986 | Woods .................................. 434/88 |
| 5,054,390 | 10/1991 | Birtles .................................. 101/163 X |
| 5,105,551 | 4/1992 | McCutchen et al. .............. 434/87 X |

FOREIGN PATENT DOCUMENTS

| | | |
|---|---|---|
| 2024430 | 12/1971 | Fed. Rep. of Germany . |
| 411964 | 6/1934 | United Kingdom .................. 434/88 |
| 580598 | 9/1946 | United Kingdom . |
| 737461 | 9/1955 | United Kingdom ................ 101/129 |

Primary Examiner—John J. Wilson
Assistant Examiner—L. Thomas
Attorney, Agent, or Firm—John C. Thompson

[57] ABSTRACT

An educational device in the form of a children's pad printing kit (10). The kit includes a smooth, preferably transparent, transfer sheet (32) upon which images may be drawn or traced, one or more felt tip ink pens 22, preferably water based, and a hand manipulable deformable rubber-like transfer pad assembly (20) which includes a transfer pad (36) which is capable of lifting off an image from the surface of the transfer sheet when the rubber-like transfer pad is placed into contact with the ink image on the surface, the transfer pad being capable of depositing the lifted-off image upon another surface, such as the surface of a sheet of drawing paper, when the pad is placed into contact with the other surface. The kit may additionally include artwork (26) which has images to be traced, and stencils (24) which may be used for forming images on the surface of the transfer sheet.

7 Claims, 1 Drawing Sheet

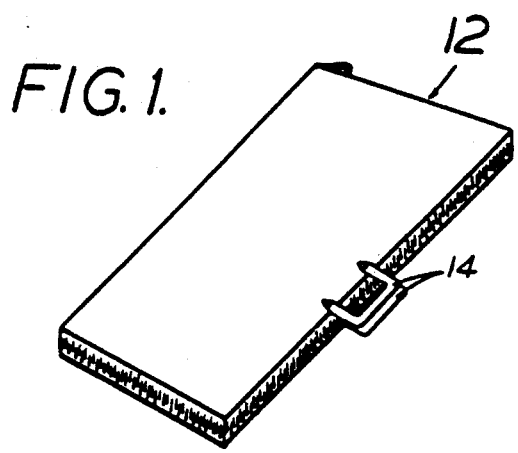
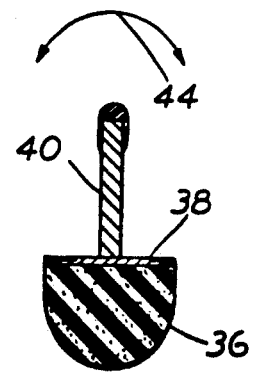
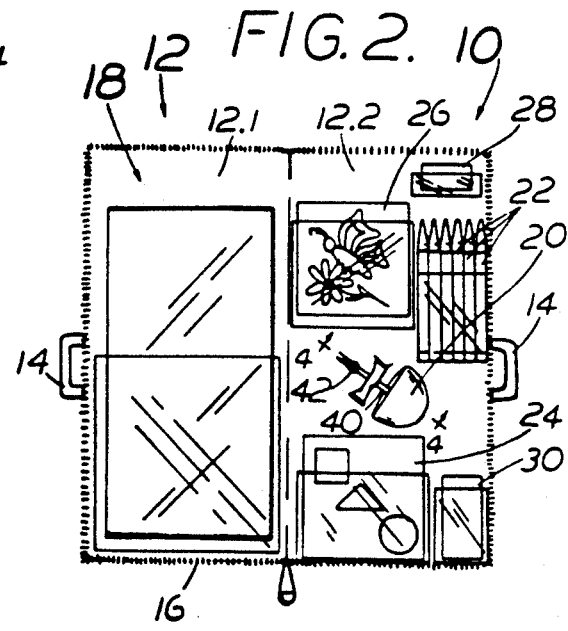
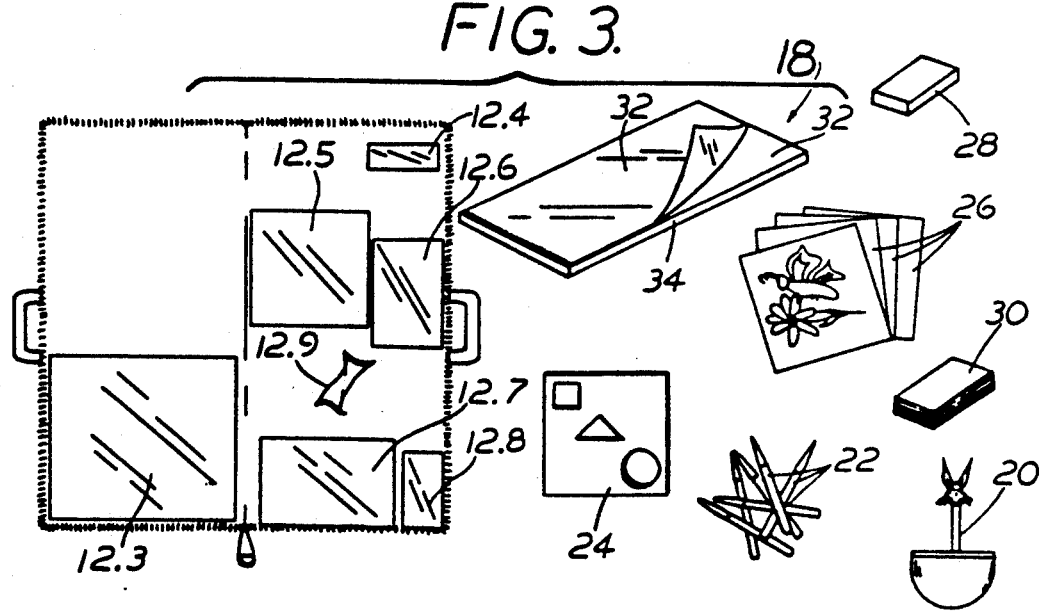

CHILDREN'S PAD PRINTING KIT

TECHNICAL FIELD

The present invention relates generally to educational devices, and more particularly to such a device which is used to aid children in developing manual dexterity and artistic talent by permitting them to trace, stencil, and/or draw images upon a reusable transfer sheet, and to then transfer completed images from the reusable transfer sheet unto another surface.

BACKGROUND OF THE INVENTION

Educational devices to assist children in developing manual dexterity and in learning drafting or drawing skills are well known in the art, and representative examples are shown in U.S. Pat. No. 2,918,732 issued Dec. 29, 1959, United Kingdom Patent 411,964 patented June, 1934 and United Kingdom Patent 580,598 patented September 1946. These devices, and others like them, permit a child to trace drawings on a transparent sheet which snugly overlies a previously prepared drawing or artwork. These devices include not only the transparent sheet upon which the child is to trace, but may also include the drawings which the child is to trace. As shown in U.K. 580,598 the educational toy may also include a plurality of pencils or pens. The devices shown in these three patents have the disadvantage in that in all cases the final image is placed upon a transparent sheet, which sheet is typically designed for future reuse. Therefore images drafted by the child will eventually have to be erased.

It is also known from West German Patent Application 2,024,430 (published Dec. 9, 1971) that a kit may be provided having a plurality of stencils which will permit the child to trace stenciled images upon a sheet of paper. Various stencils may be combined when utilizing this educational device. While this device does not preclude free hand drafting on the part of the child, no provisions are made for tracing. In addition, there is no teaching of transferring the stenciled images from the original sheet to another surface, which surface may have an irregular surface and therefore be unsuitable for initially stencilling thereon.

It is also well known in the printing industry that silk screened images, typically formed from oil based inks, may be transferred from an intermediate surface to an article which may have a non-planar surface, this process being known as pad printing. Representative patents which show this form of printing are U.S. Pat. No. 5,054,390, granted Oct. 8, 1991 and United Kingdom Patent 737,461, published Sept. 28, 1955. This commercially known printing process typically utilizes an oil based ink which was printed onto a flat transfer plate or sheet and then transferred to the final object, typically having a non-planar surface, by a deformable rubber-like transfer pad. This process has particular application for printing upon irregularly shaped articles, such as bowls, where it is not possible to print onto the irregularly shaped article using conventional flat plate printing techniques. Because of the use of oil based inks, this process is not considered suitable for use by a child.

OBJECTS AND SUMMARY OF THE INVENTION

It is an object of the present invention to provide an educational device in the form of a children's pad printing kit which will permit the user to draft an image upon a special transfer surface, and to then transfer the image by a transfer pad to another surface upon which the final image is to reside, the transfer surface being capable of receiving images formed by differing processes, and which will permit correction prior to transfer to the surface which receives the final print image.

More specifically, it is a feature of the present invention to provide a children'pad printing kit which includes, at a minimum, an ink pen, a transfer surface sheet upon which the ink within the pen may be placed without spreading on the surface of the sheet or absorption into the sheet, and without degradation of the ink, and a hand manipulable assembly deformable rubber-like transfer pad which is compatible with the ink within the pen and which is capable of lifting an image from the surface of the transfer sheet when the pad is placed into contract with the image on the transfer surface, the hand manipulable transfer pad assembly then being able to deposit the lifted-off image onto the surface of another print material.

It is another feature of this invention to provide one or more pens for use with the children's pad printing kit set forth above, each pen being provided with a water based ink that may be of differing colors.

It is a further feature of this invention to provide or more stencils in the kit which may be used to form images upon the surface of the transfer sheet.

It is yet another feature of this invention to form the transfer sheet of a clear material, such as a smooth plastic sheet, so that something to be traced may be placed behind it.

Another feature of the present invention is to provide one or more sheets of artwork within the kit, which artwork can be traced onto a transparent transfer sheet.

These and other objects and advantages of the present invention will become more apparent after a consideration of the following detailed description taken in conjunction with the accompanying drawings in which a preferred form of the present invention is illustrated.

BRIEF DESCRIPTION OF THE DRAWINGS

FIG. 1 is a perspective view of the carrying case for the children's pad printing kit of this invention, the carrying case being shown closed.

FIG. 2 is a view showing the carrying case of FIG. 1 open, with the various components of the kit being mounted therein.

FIG. 3 is an exploded view of the carrying case and the various components of the children's pad printing kit.

FIG. 4 is a cross-sectional view taken generally along the line 4—4 in FIG. 2.

DETAILED DESCRIPTION

With reference first to FIG. 2, the children's pad printing kit is indicated generally at 10. The kit is shown mounted in an optional carrying case indicated generally at 12. The carrying case has the form generally of a brief case with two sides 12.1 and 12. 2, each side of the case being provided with a handle 14. The sides have adjacent edges hinged together and the other edges are secured together by a zipper 16 when the case is closed. Thus, the case may be closed by zipping the zipper 16 in the manner shown in FIG. 1, and alternatively the zipper may be unzipped to open the case as shown in FIG. 2. The carrying case is provided with securing means for receiving the various components of the kit. Thus, as can be seen from FIGS. 2 and 3, the kit is provided with pockets 12.3 through 12.8. In addition, other securing means may be provided, such as the strap 12.9. While a specific form of carrying case is illustrated in these drawings for carrying the various components of the kit, it should be appreciated that the carrying case as illustrated is only an optional accessory and typically the various elements of the kit will be sold together on a blister package. Alternatively, they may sold in a kit form in a typical toy box.

The children's pad printing kit includes, as its principal components, a transfer surface assembly, indicated generally at 18, a transfer pad assembly indicated generally at 20, and water based felt tip pens 22, preferably of differing colors. Other components of the children's pad printing kit of this invention may include one or more stencils 24, artwork in the form of printed paper sheets 26, and a sponge 28 for cleaning the surface of the transfer surface assembly and the outer surface of the transfer pad. An instruction book 30 may also be provided, which instruction book may give instructions for clean-up and for various activities which may employ the kit of this invention. In addition, although not shown, the kit may include a base for the transfer pad assembly 20 so that the pad assembly may be suitably supported when not in use.

The transfer surface assembly 18, includes, as its principal component, a transfer surface sheet which is formed of a substantially smooth continuous sheet material which is compatible with the water based inks in the pens 22. Thus, the transfer surface sheet should be of such a material that the water based inks provided with the kit may be placed upon the surface of the sheet without spreading or absorption of the inks, and without degradation of the ink due to a chemical reaction between the ink and the surface sheet. It has been found that various plastic materials are suitable for this purpose, such plastic materials including MYLAR ® and certain grades of polyethylene. In accordance with the preferred embodiment illustrated in FIGS. 2 and 3, the transfer surface sheet is formed of a translucent or transparent material, the sheet being mounted upon a rigid backing board 34 along at least one edge, and preferably along two edges, so that material to be traced, such as the artwork 26, may be placed between the surface sheet 32 and the backing board 34, and be maintained in place during tracing without movement of the transfer sheet relative to the artwork. The backing board 34 may be formed of a material which does not have the substantially continuous smooth surface which is desirable when tracing or otherwise placing images upon the surface sheet 32, and therefore it may in turn be covered with a further transfer surface sheet 32, which surface sheet can be adhered thereto by gluing or the like.

The transfer pad assembly 20 includes a deformable rubber-like transfer pad 36 which is mounted on a rigid backing 38, there being a handle extending outwardly from the backing. The pad 36 is preferably formed of those materials which are typically utilized in the pad printing industry, one such example being a silicon based rubber as disclosed in U.S. Pat. No. 5,054,390. Other materials are well known to those having ordinary skill in the pad printing industry, and it is only necessary that a material be selected from those known in the art, which material is compatible with the water based inks provided in the kit of this invention.

While only one stencil is illustrated in the various figures of this application, other forms of stencils may be utilized with the kit of this invention. In addition, while only four sheets of artwork 26 are illustrated, any number may be provided. In one form of the invention the artwork may be integrated with the kit of this invention. For example, the artwork may include a series of pictures of a cartoon character, and the handle 40 of the pad assembly 20 may be provided with a statuette 42 at the end of the handle which is of the same character shown in the artwork 26. The handle having a free end as shown. In addition, the base (not shown) which receives the transfer pad assembly 20 when not in use may also have a sculptured appearance which is compatible with the particular artwork and statuette.

When present invention is utilized, the user will, with one of the pens, draw, trace, or stencil an image upon the surface of sheet 32. If the user does not like the image which has been placed upon the sheet 32, a portion, or all of it, may be erased with the sponge 28. When the user is satisfied with the image, it may then be transferred to another surface for more or less permanent retention. This is done by picking up the transfer pad assembly 20 with the handle 40, by placing the pad 36 in intimate contact with the image on the transfer surface sheet 32. When this occurs, the image will be transferred from the surface of the sheet 32 to the surface of the pad 36. The pad 36 can now be lifted off the sheet 32 and then be placed on the surface of the material which is to receive the image, a rocking motion typically being utilized to transfer the image from the pad 36 to the surface of the final print material, the rocking motion being indicated by the double ended arrow 44 in FIG. 4. By utilizing the kit of this invention, images may be transferred to surfaces where the user could not normally draw with any degree of assurance due to the irregular shape or contour of the surface. By utilizing water based inks it is possible to remove the image from a surface after transfer, provided that the surface may be washed by the sponge 28 without damage to the material of the surface.

While a pad printing kit has been disclosed above, it should be noted that other forms of the kit may be employed in the practice of the broader aspects of this invention. Therefore, while a preferred embodiment has been shown and described above in which the principles of the present invention have been incorporated, it is to be understood that this invention is not to be limited to the particular details shown and described above, but that, in fact, widely differing means may be employed in the practice of the broader aspects of this invention.

What is claimed is:

1. A children's pad printing kit capable of being used in such a manner that images drafted upon a special transfer surface by an ink pen provided with the kit may be subsequently lifted off and transferred to another surface by a special deformable transfer pad; said kit comprising the combination of:

a substantially continuous transfer sheet upon which a water based ink may be placed without spreading of the ink on the surface of the transfer sheet, without absorption of the ink into the sheet, and without degradation of the ink;

a pen provided with a washable water based ink which may be used to draft images upon the transfer sheet set forth above; and a light weight hand manipulable transfer pad assembly including a deformable rubber-like transfer pad compatible with the water based ink within the pen, the transfer pad assembly also including a handle interconnected with the transfer pad, the handle having a free end spaced away from the pad, which handle will permit a child to place the transfer pad into contact with an image drafted upon the transfer sheet, to lift the image from the transfer sheet as the transfer pad is moved away from the transfer sheet, and to deposit the image which has been lifted off the transfer sheet upon another surface, such as a surface of a sheet of drawing paper when the child places the transfer pad into contact with the other surface.

2. The children's pad printing kit as set forth in claim 1, wherein said free end includes a statuette.

3. A children's pad printing kit comprising the combination of:
- a substantially continuous transfer sheet upon which an ink may be placed without spreading of the ink on the surface of the transfer sheet, without absorption of the ink into the sheet, and without degradation of the ink;
- a washable ink pen which may be used to draft images upon the transfer sheet set forth above; and
- a hand manipulable transfer pad assembly including
  - a deformable rubber-like transfer pad compatible with the ink within the pen, and
  - a light weight handle interconnected with the transfer pad for permitting a child to transfer an image from the transfer sheet to an other surface by placing the deformable rubber-like transfer pad into contact with an image drafted upon the transfer sheet, by lifting the image from the transfer sheet as the transferred pad is moved away from the transfer sheet, and by depositing the image which has been lifted off the transfer sheet upon another surface when the child places the transfer pad into contact with the other surface, wherein the handle has a free end spaced away from the pad.

4. The children's pad printing kit as set forth in claim 3 wherein the transfer sheet is formed of a transparent plastic sheet, smooth on both sides, so that something to be traced may be placed behind it.

5. The children's pad printing kit as set forth in claim 4 wherein the kit further includes one or more sheets of artwork which may be placed behind the transparent plastic sheet.

6. A children's pad printing kit as set forth in claim 3 wherein the pen is provided with a water based ink.

7. The children's pad printing kit as set forth in claim 6 wherein a plurality of pens are provided, the pens having differing colors of water based inks.

* * * * *